United States Patent [19]

Kato et al.

[11] Patent Number: 5,634,152

[45] Date of Patent: May 27, 1997

[54] CAMERA WITH BUILT-IN FLASH

[75] Inventors: Minoru Kato, Kawasaki; Hiroshi Wakabayashi, Yokohama; Kiyosada Machida, Urawa, all of Japan

[73] Assignee: Nikon Corporation, Tokyo, Japan

[21] Appl. No.: 582,179

[22] Filed: Jan. 2, 1996

[30] Foreign Application Priority Data

Jan. 24, 1995 [JP] Japan .................................. 7-009159
Jan. 24, 1995 [JP] Japan .................................. 7-009172

[51] Int. Cl.⁶ .................................................. G03B 15/03
[52] U.S. Cl. ........................................... 396/158; 396/155
[58] Field of Search ............................. 354/132, 149.11, 354/288; 396/155, 158, 157

[56] References Cited

U.S. PATENT DOCUMENTS 4,918,477  4/1990  Matsuda et al. ........................ 354/288
5,262,809  11/1993  Nishimura et al. ..................... 354/132
5,453,812  9/1995  Terada et al. .......................... 354/402

*Primary Examiner*—Safet Metjahic
*Assistant Examiner*—Nicholas J. Tuccillo

[57] ABSTRACT

A camera with a built-in flash unit, provided with a flash emitting portion, includes a red-eye reducing lamp positioned close to the flash emitting portion, and a Fresnel lens positioned in front of the flash emitting portion and the red-eye reducing lamp. Furthermore, the camera includes a protruding portion, which is positioned close to the flash emitting portion and the red-eye reducing lamp and is adapted to be contacted by the finger of the camera-holding hand. Owing to such contact, the photographer is warned as to the improper positioning of his finger, so that the flash emitting portion and the red-eye reducing lamp can be protected from being carelessly covered during the phototaking operation.

10 Claims, 3 Drawing Sheets

CAMERA WITH BUILT-IN FLASH

BACKGROUND OF THE INVENTION

1. Field of the Invention

The present invention relates to a camera with a built-in flash, such as a small-sized camera, generally called compact camera, or a single-lens reflex camera equipped with a flash (electronic flash device) for effecting flash-assisted phototaking operation.

2. Related Background Art

In cameras with built-in flashes in the conventional art, the flash emitting portion is usually provided on the front face of the camera body, in a position as distant as possible from the lens barrel of the phototaking lens, for example in the lateral upper portion of the camera body, opposite the shutter release button provided at the left-hand portion of the camera body when it is seen from the front side.

In the phototaking operation with the flash from the flash emitting portion in such a camera with built-in flash, in case of color photographing of a person from the front at a short distance, it is already known that there may result the so-called red-eye effect, or reproduction of the pupils of the person in red color. Such a red-eye effect is particularly conspicuous when the flash emitting portion is positioned close to the optical axis of the phototaking lens of the camera, and, for avoiding such phenomenon, it is necessary to maximize, as far as possible, the distance between the flash emitting portion and the phototaking lens.

However, in the small-sized camera such as the compact camera, it is difficult to obtain a sufficient distance between the flash emitting portion and the optical axis of the phototaking lens, so that the above-mentioned red-eye effect is often difficult to prevent.

For this reason, in such a camera with a built-in flash, the red-eye effect has conventionally been made less conspicuous by providing a separate red-eye reducing lamp on the front face of the camera body, for example in the vicinity of the lens barrel, and turning on such red-eye reducing lamp in synchronization with the electronic flash device at the flash-assisted phototaking operation.

However, in such conventional camera with built-in flash, the positioning of the light-emitting member, or such red-eye reducing lamp, poses difficulty in the installation in a part of the camera body. As it is to be installed in the vicinity of the lens barrel on the front face of the camera body, it has to be assembled independently from the flash emitting portion, which is linked in operation. Consequently these two portions cannot be combined as a single unit, and the assembling process becomes more complex.

Besides the space for incorporating the light emitting member such as the red-eye reducing lamp is quite limited in the camera body, and there are required particular assembling parts, protective plate etc. for forming an installing place for the light emitting member within the camera body and for installing such a light emitting member so as to be capable of emitting the light toward the front side of the camera body. Consequently, the installation of such a light emitting member leads to an increase in the number of component parts and eventually an increase in the size of the camera body.

For this reason, it is conceived, in the camera with a built-in flash emitting portion in an upper lateral portion of the camera body, to provide the red-eye reducing lamp close to the above-mentioned flash emitting portion. Such an arrangement enables single unit formation with the electronic flash device, resulting in improvement in assembling ability and reduction in size of the camera body by the utilization of the dead space.

However, if such limit emitting member functioning as the red-eye reducing lamp is simply positioned close to the flash emitting portion, it may be covered with the finger of the photographer in holding the camera body, so that the red-eye reducing function at the flash phototaking operation may be hindered. Such trouble in the holding of the camera body becomes more enhanced if such a light emitting member is positioned under the flash emitting portion.

Even in the conventional camera with built-in flash as explained above, there has been the possibility that the flash emitting window of the flash device is covered by the finger at the flash-assisted phototaking operation, but, if the light emitting member constituting the red-eye reducing lamp is provided under the flash emitting portion as explained above, the probability that such light emitting member is covered by the finger of the photographer is higher than that of covering the light emitting portion. Such drawback can only be prevented by sufficient attention of the photographer in the manner of holding of the camera, and is a problem in secure achievement of the camera functions. For this reason there has been desired certain measure capable of resolving such drawback.

Also in case the light emitting member constituting the red-eye reducing lamp is positioned next to the flash emitting portion, for example within the reflector of the flash emitting portion, the light from the flash emitting portion is intercepted by the light emitting member, so that the amount of flash light becomes deficient.

Also in the protective panel, composed for example of glass, provided in front of the flash emitting portion and the light emitting member constituting the red-eye reducing lamp, there are generally formed a Fresnel lens in front of the flash emitting portion and a plain panel or another Fresnel lens in front of the adjacent light emitting member, but such an arrangement results in the following drawbacks.

The light from the flash emitting portion also passes the plain portion of the protective panel in front of the light emitting member, while the light from the light emitting member is projected, also through the same plain portion, to the front side of the camera body, so that, in the flash-assisted phototaking operation, the two light beams transmitted through the protective panel overlap on the object to generate undesirable unevenness or shadow-like patterns thereon.

Also in the above-explained protective panel in which the light transmitting portions are formed separately, corresponding respectively to the flash emitting portion and the light emitting member, the junction or boundary of such light transmitting portions affect the light emission characteristics, thus eventually causing uneven light intensity on the object. Consequently there has been desired a measure capable of resolving such drawbacks.

SUMMARY OF THE INVENTION

In consideration of the foregoing, an object of the present invention, in a first aspect thereof, is to provide a camera with a built-in flash capable, in positioning a light emitting member, which functions as a red-eye reducing lamp for alleviating the red-eye effect in the flash-assisted phototaking operation, immediately under the flash emitting portion, and preventing the drawback that such a light emitting member is undesirably covered, for example by the finger of the photographer.

The above-mentioned object can be attained, according to the present invention, by a camera with a built-in flash provided with a flash emitting portion, a light emitting member positioned close thereto and functioning as a red-eye reducing lamp, and a protective plate or a light transmitting member provided with Fresnel lenses and so positioned at the front face side of the camera body as to cover the front side of said flash emitting portion and said light emitting member, said camera comprising a protruding portion so formed in the vicinity of said flash emitting portion and light emitting member as to be contacted by the photographer in holding the camera body, thereby preventing the front face of said flash emitting portion and light emitting member from being covered.

Also according to the present invention, there is provided a camera with a built-in flash comprising a flash emitting portion incorporated in the camera body, in a portion thereof close to a lateral end thereof opposite to the shutter release button, a light emitting member functioning for example as a red-eye reducing lamp and positioned immediately under a reflector constituting said flash emitting portion, a protective plate of Fresnel lenses constituting a light transmitting member so positioned as to cover the front side of said flash emitting portion and light emitting member, and a protruding portion provided in a position in front of said light transmitting member but out of the path of the light emitted by the flash emitting portion and the light emitting member and transmitted by said light transmitting member, and adapted to be contacted by the photographer in holding the camera body and to prevent the front side of the flash emitting portion and the light emitting member from being covered by the camera-holding hand of the photographer.

According to the present invention, in a position corresponding to a lower part of the light transmitting member composed of a protective plate or Fresnel lenses, or in the vicinity thereof, so as to be out of the lights from the flash emitting portion and the light emitting member functioning as the red-eye reducing lamp, there is provided a protruding portion adapted to be contacted by the photographer in holding the camera body and to prevent the front side of the flash emitting portion and the light emitting member from being covered by the photographer. Thus, when the photographer holds the camera body in the flash-assisted phototaking operation, the finger of the photographer comes into contact with the protruding portion, thereby being prevented from covering the flash emitting portion and the light emitting member functioning as the red-eye reducing lamp.

In a second embodiment, the present invention is to provide an inexpensive camera with a built-in flash, capable of totally resolving the drawbacks encountered when a light emitting member, functioning as the red-eye reducing lamp for alleviating the red-eye effect in the flash-assisted phototaking operation, is positioned adjacent to the flash emitting portion, for example the increased cost resulting from separate formations of the light transmitting portions respectively corresponding to the flash emitting portion and the light emitting member, a deficiency in the amount of flash light, resulting from interception of the light from the flash emitting portion by the light emitting member, and an uneven light intensity on the object, resulting from mixing of the lights from the flash emitting portion and the light emitting member.

The above-mentioned object can be attained, according to the present invention, by a camera with a built-in flash, comprising a flash emitting portion incorporated in the camera body, a flash emitting characteristic modifying member provided in front of the flash emitting portion and adapted to modify the illumination characteristics of the flash light toward the object side, and a light emitting member functioning as a red-eye reducing lamp and positioned adjacent to the flash emitting portion, wherein a part of the flash emitting characteristic modifying member is extended to the front side of the light emitting member.

The above-mentioned light emitting member is positioned close to a flash reflector constituting the flash emitting portion and is supported at a position adjacent to the flash reflector. Also the above-mentioned light emitting member is provided at an angle to the phototaking optical axis, in view of deflection of light caused by a Fresnel lens constituting the flash emitting characteristic modifying member.

According to the present invention, the light emitting member functioning as the red-eye reducing lamp does not intercept the light from the flash emitting portion, as it is supported by the flash reflector, in a position adjacent to the flash emitting portion. Also according to the present invention, the flash emitting characteristic modifying member, composed of a Fresnel lens for modifying the direction of emission of the flash light, is provided covering the front side of the flash emitting portion and the adjacent light emitting member, thereby being commonly used for both and avoiding uneven light intensity by the lights thereof on the object.

DETAILED DESCRIPTION OF THE PREFERRED EMBODIMENTS

Figure 1:
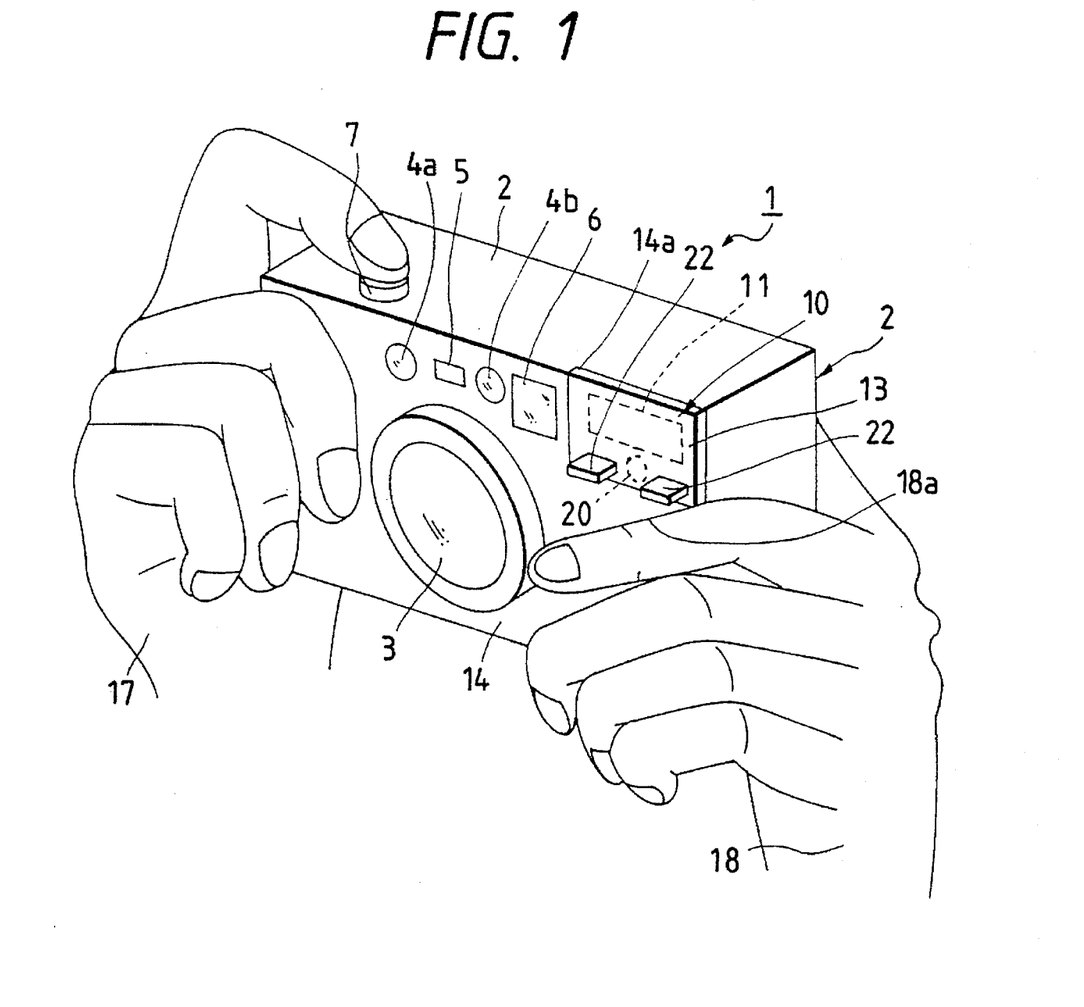
FIG. 1 is a schematic perspective view of an embodiment according to the camera with built-in flash of the present invention.
Figure 2:
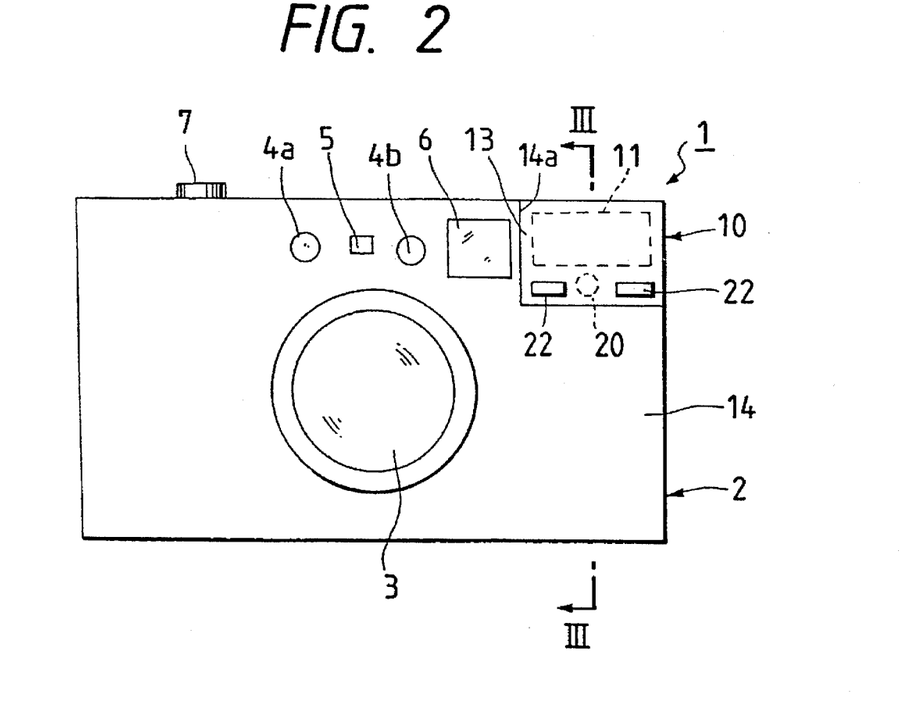
FIG. 2 is a front view of the camera shown in FIG. 1.
Figure 3:
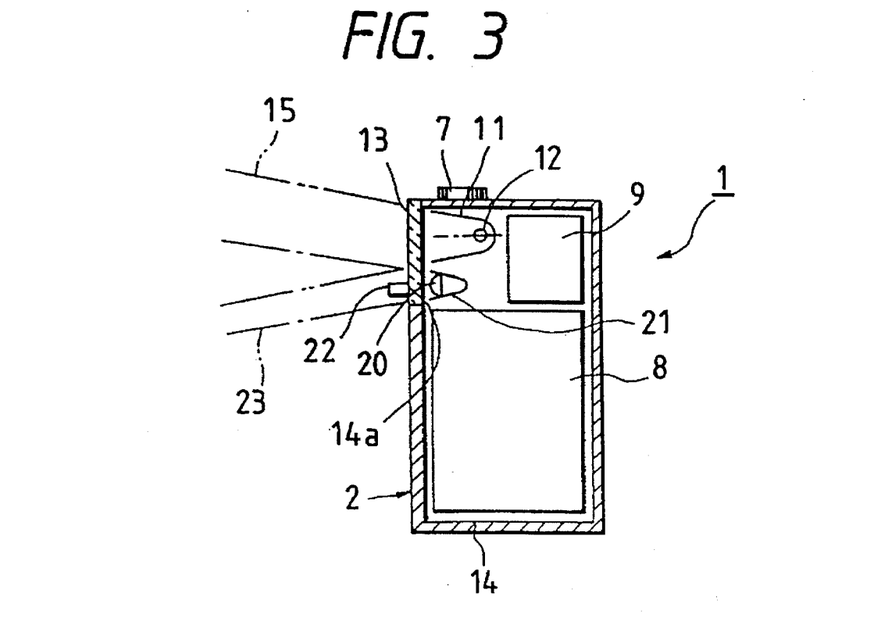
FIG. 3 is a cross-sectional view along a line III—III in FIG. 2.

FIGS. 1 to 3 illustrate an embodiment of the camera with built-in flash of the present invention, wherein a camera 1 is a compact camera with a lens shutter provided, as shown in FIGS. 1 and 2, with a phototaking lens 3 supported by a lens barrel, at the center of the front face of a camera body 2.

On the front face of the above-mentioned camera body 2 and above the phototaking lens 3, there are provided a light-emitting window 4a and a light-receiving window 4b constituting an AF unit for auto focusing, a light-receiving window 5 of an AE unit for automatic exposure control, and a finder window 6 of a view finder optical system.

A shutter release button 7, adapted to be depressed, protrudes on the upper face of the camera body 2 and in a lateral portion thereof (left-hand side seen from the front).

In FIG. 3, there are shown a camera structure 8 which is provided inside the camera body 2 and includes, for example, a cartridge chamber for accommodating a film cartridge, a spool chamber for a spool for taking up the film, a dark chamber connecting to the lens barrel and a battery, and an electrical control unit 9 for controlling electric drive systems in the camera, such as a flash emitting device 10 to be explained later, an AF unit and an AE unit.

A flash emitting portion 10 is provided on the front face of the camera body 2 and in an upper portion in the other lateral portion, namely in the right-hand portion when seen from the front, opposite to the shutter release button, and is adapted to project flash light toward the front side of the camera.

The flash emitting portion 10 is composed of a flash reflector 11, a xenon flash tube 12 positioned inside the flash reflector 11 and a Fresnel lens 13 constituting a light transmitting member provided in front of the flash reflector 11.

In FIG. 3, a camera body cover 14, covering the main body of the camera, is provided, in a portion thereof, with an aperture 14a in which the Fresnel lens 13 of the flash emitting portion 10 is fitted.

The above-explained camera 1 may be provided with still other mechanisms and components which are attached or assembled in respectively suitable positions, but such additional mechanisms and components are already known and will not, therefore, be explained further.

According to the present invention, in the camera 1 of the above-explained configuration, a red-eye reducing lamp 20 constituting a light emitting member for alleviating the red-eye effect in the flash-assisted phototaking operation, is provided under the flash reflector 11 of the flash emitting portion 10.

The above-mentioned red-eye reducing lamp 20 is provided with a reflecting mirror 21 for defining the irradiating direction of the lamp 20 and is supported by the lower side of the flash reflector 11 of the above-mentioned flash emitting portion 10.

The above-mentioned red-eye reducing lamp 20 is covered by a lower part of the Fresnel lens 13 of the flash emitting portion 10. Also protruding portions 22, 22 adapted to be contacted by the camera-holding hand of the photographer, in holding the camera body 2, thereby preventing the front side of the flash emitting potion 10 and the red-eye reducing lamp 20 from being covered by the hand of the photographer, are provided in positions of the Fresnel lens 13, out of the areas transmitted by the flash light 15 from the flash emitting portion 10 and the irradiating light 23 from the red-eye reducing lamp 20.

Such protruding portions 22, formed in predetermined positions on the surface of the Fresnel lens 13, come into contact for example with the index finger 18a of the left hand 18 of the photographer in the holding of the camera body 2 in the flash-assisted phototaking operation, thereby limiting the camera-holding hand to a predetermined position. Thus the areas corresponding to the flash emitting portion 10 and the red-eye reducing lamp 20 can be protected from being covered by the finger 18a.

Consequently, such configuration can prevent, in positioning the red-eye reducing lamp 20 for alleviating the red-eye effect in the flash-assisted phototaking operation immediately under the flash emitting portion 10, the drawback that these light emitting parts are covered by the finger 18a of the photographer. More specifically, if the photographer carelessly uses the left hand 18 in FIG. 1 and moves the index finger 18a, it comes into contact with the protruding portions 22, 22 to give a warning to the photographer, whereby appropriate holding with the left hand 18 can be performed.

Stated differently, in the presence of the protruding portions 22, 22, the photographer cannot grip this part, because of the contact with the protruding portions 22, 22 in holding the camera body. Thus the photographer pays sufficient attention in achieving appropriate holding of the camera body 2.

In FIG. 1 there is also shown the right hand 17 of the photographer, which executes the depressing operation of the shutter release button 7, while holding the left-hand portion, seen from the front side, of the camera body 2 in an already known manner.

In the above-explained configuration, in holding the camera body 2, the photographer is guided to place the index finger 18a of the left hand 18 below the protruding portions 22, 22 so that the flash light 15 and the light 23 from the red-eye reducing lamp are not intercepted. Also the protruding portions 22, 22, provided in the lower part of the Fresnel lens 13 in a protruding form, can hide the internal structure of the camera body 2, that is visible through the Fresnel lens 13. In the absence of such protruding portions 22, 22, the Fresnel lens 13 becomes flat, through which the internal structure of the camera body 2 will become visible.

In the above-explained configuration, the red-eye reducing lamp 20 is positioned under the flash emitting portion 10, but, because of the presence of the protruding portions 22, 22 on both sides of the red-eye reducing lamp 20, the guide position in holding the camera body 2 remain unchanged, so that the holding characteristic thereof also remains unchanged. Thus the presence of the red-eye reducing lamp 20 under the flash emitting portion 10 does not deteriorate the holding characteristic of the camera.

The present invention is not limited by the above-explained embodiment, but is naturally subject to suitable modification and variations in the components of the camera 1 with built-in flash.

For example, in the above-explained embodiment, the protruding portions 22, 22 formed on the surface of the Fresnel lens 13 may be modified into an arbitrary form, in consideration of the holding performance or feeling of the photographer and the aesthetic appearance of the camera 1.

Also in the foregoing embodiment, the protruding portion adapted to be contacted by the photographer in holding the camera body 2 and to prevent the flash emitting portion 10 and the red-eye reducing lamp 20 from being covered by the hand of the photographer is provided in a pair on both sides of the red-eye reducing lamp 20, but the present invention is not limited to such configuration. For example it may be formed as a continuous protrusion in a position close to the flash emitting portion 10 and the red-eye reducing lamp 20. In such case, such protruding portion is not necessary formed on the lower part of the Fresnel lens 13 but may be formed integrally with the cover 14 of the camera body 2.

Also as a further variation, the protruding portions 22, 22 in the above-explained embodiment are formed integrally with the cover 14 of the camera body and the Fresnel lens 13 may be formed with such a form as to avoid the positions of such protruding portions 22.

In the foregoing embodiment, the red-eye reducing lamp 20 consisting of the light emitting member is immediately under the flash emitting portion 10, but it is also possible to position the red-eye reducing lamp 20 at the side of the flash emitting portion 10 and to form the protruding portions therebelow. Such protruding portions may naturally be provided either on the Fresnel lens 13 or on the camera body cover 14.

In the foregoing embodiment, the red-eye reducing lamp 20 is positioned under the flash reflector 11 constituting the flash emitting portion 10, but the above-mentioned red-eye reducing lamp 20 may also be positioned inside the flash reflector 11 but under the xenon tube 12.

In the foregoing embodiment, the light transmitting member covering the front side of the flash emitting portion 10 and the red-eye reducing lamp 20 consisting of the light emitting member is composed of a Fresnel lens 13, but it may naturally be replaced by a configuration capable of suitably regulating the light irradiating directions respectively corresponding to the light emitting positions, or an integrally formed Fresnel lens-like member such as a panel with various lens functions or a simple protective plate composed of glass or plastics.

Also the foregoing embodiment has been explained by an application to a compact camera with a lens shutter, but the present invention is not limited to such case and is applicable to the cameras of other known structures, such as a single-lens reflex camera.

The configuration of the light emitting unit, consisting of the flash emitting portion 10 and the adjacent red-eye reducing lamp 20, is not limited to the electronic flash device incorporated in the camera 1 but may also be formed as a detachable electronic flash device, formed separately from the camera 1.

Furthermore, in the foregoing embodiment, the light emitting member constitutes the red-eye reducing lamp 20, but the present invention is not limited to such case and can provide a similar effect for example in case the light emitting member is designed to emit the auxiliary light for achieving auto focusing function in the dark.

As explained in the foregoing, the camera with built-in flash of the present invention, provided with a flash emitting portion, a light emitting member provided close thereto and functioning for example as a red-eye reducing lamp, and a light transmitting member composed of a protective plate or a Fresnel lens provided at the front side of the camera so as to cover the front part of the flash emitting portion and the light emitting member, comprises a protruding portion positioned in the vicinity of the flash emitting portion and the light emitting member and adapted to be contacted by the photographer in holding the camera body and to prevent the front side of the flash emitting portion and the light emitting member from being covered by the photographer. Thus there can be achieved the following effects with a simple configuration.

In holding the camera body at the phototaking operation, the photographer places the index finger of the left hand below the protruding portion, provided in the vicinity of the flash emitting portion and the light emitting member, because of the contact with the protruding portion, thereby protecting the areas corresponding to the flash emitting portion and the light emitting member from being covered. Consequently the flash light and the light from the light emitting member constituting the red-eye reducing lamp are not intercepted, so that the flash-assisted phototaking operation and the red-eye reducing function by the light from the light emitting member can be fully exploited. Thus the camera operations can be securely achieved and the phototaking operation can be appropriately executed.

Even when the light emitting member constituting the red-eye is positioned under and close to the flash emitting portion, the camera holding position at the phototaking operation varies scarcely in comparison with that of the conventional camera, because of the presence of the protruding position in the vicinity of the flash emitting portion and the light emitting member, so that the holding performance of the camera body can be maintained. Thus, even when the light emitting member, constituting the red-eye reducing lamp, is positioned under the flash emitting portion, the holding performance of the camera body is not deteriorated, and the operability thereof remains unchanged.

Also according to the present invention, a light emitting member functioning for example as the red-eye reducing lamp is positioned under and close to the flash reflector of the flash emitting portion, incorporated in the camera body in a lateral portion opposite to the shutter release button, while a light transmitting member is provided at the front face of the camera body so as to cover the front side of the flash emitting portion and the light emitting member, and a protruding portion, adapted to be contacted by the photographer in holding the camera body and to prevent the front side of the flash emitting portion and the light emitting member from being covered by the photographer, is provided on the front face of the above-mentioned light transmitting member, out of the areas transmitted by the lights from the flash emitting portion and the light emitting member. The protruding portion, formed on the Fresnel lens constituting the light transmitting member, out of the areas transmitted by the flash light and the light from the light emitting member, allows to shield the internal camera structure which is visible through a dead space, around the light emitting member, of the Fresnel lens. It is thus possible to prevent that the internal camera structure becomes visible through a flat area, formed in case of absence of the protruding portion.

Figure 4:
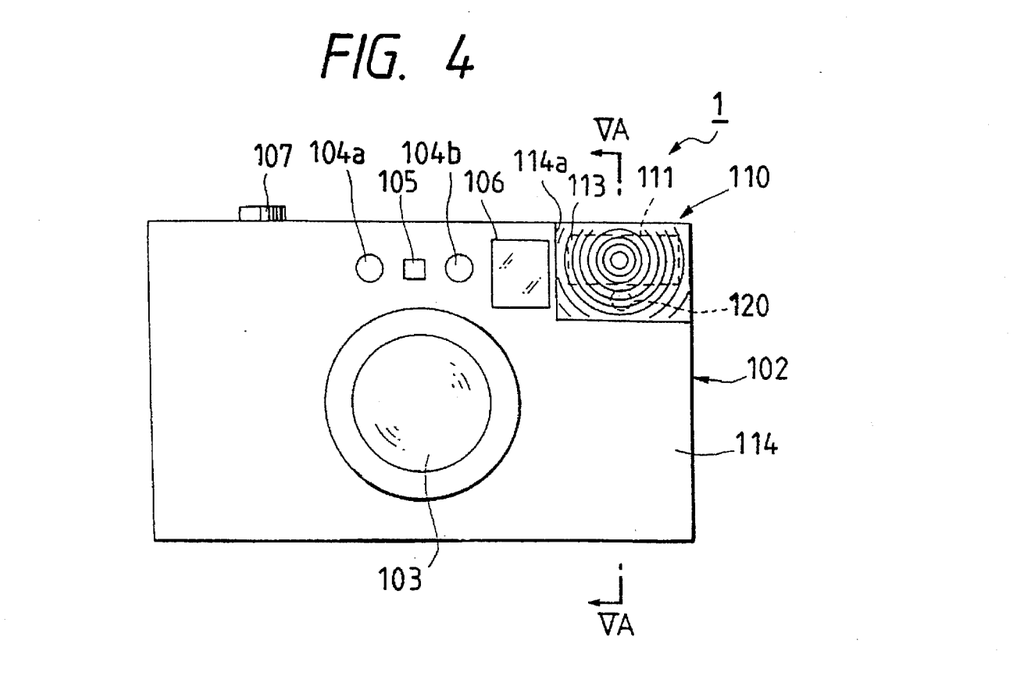
FIG. 4 is a schematic front view of an embodiment according to the camera with built-in flash of the present invention.
Figure 5A:
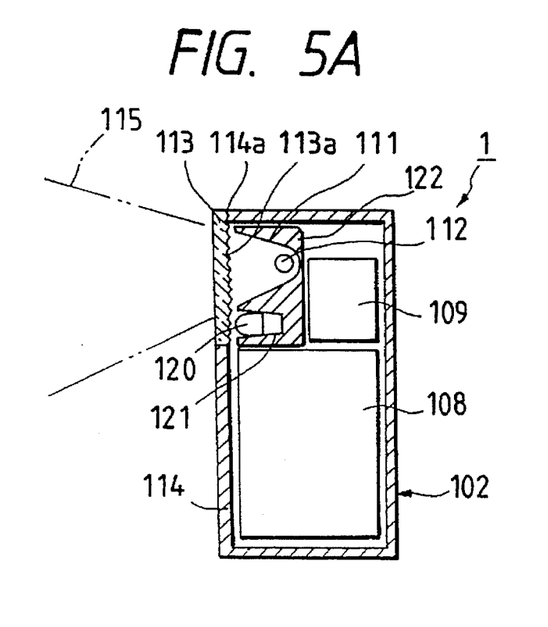
FIG. 5A is a cross-sectional view along a line VA—VA in FIG. 4.
Figure 5B:
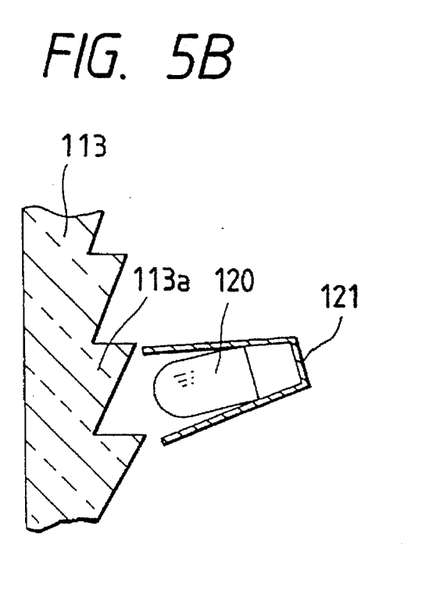
FIG. 5B is a magnified cross-sectional view of another embodiment, showing the arrangement of the light emitting member relative to the Fresnel lens.

FIGS. 4, 5A and 5B illustrate another embodiment of the camera with a built-in flash of the present invention, wherein a camera 10 consists, as will be apparent from FIGS. 4 and 5A, of a compact camera with a lens shutter, having a phototaking lens 103 supported by a lens barrel, at the front center of a camera body 102.

On the front face of the above-mentioned camera body 102 and above the phototaking lens 103, there are provided a light-emitting window 104a and a light-receiving window 104b constituting an AF unit for auto focusing, a light-receiving window 105 of an AE unit for automatic exposure control, and a finder window 106 of a view finder optical system.

A shutter release button 107, adapted to be depressed, protrudes on the upper face of the camera body 102 and in a lateral portion thereof (left-hand side seen from the front).

In FIG. 5A, there are shown a camera structure 108 which is provided inside the camera body 102 and includes, for example, a cartridge chamber for accommodating a film cartridge, a spool chamber for a spool for taking up the film, a dark chamber connecting to the lens barrel and a battery, and an electrical control unit 109 controlling electric drive systems in the camera, such as a flash emitting device 110 to be explained later, an AF unit and an AE unit.

A flash emitting portion 110 is provided on the front face of the camera body 102 and in an upper portion in the other lateral portion, namely in the right-hand portion when seen from the front, opposite to the shutter release button, and is adapted to project flash light toward the front side of the camera.

The flash emitting portion 110 is composed of a flash reflector 111, a xenon flash tube 112 positioned inside the flash reflector 111 and a Fresnel lens 113 positioned at the front face side of the flash reflector 111 and constituting a flash emission characteristic modifying member, for modifying the irradiation characteristics of the flash light 115 toward the object side.

In FIG. 5A, a camera body cover 114, covering the main body of the camera, is provided in a portion thereof with an aperture 114a in which the Fresnel lens 113 of the flash emitting portion 110 is fitted.

The above-explained camera 101 may be provided with still other mechanisms and components which are attached or assembled in respectively suitable positions, but such additional mechanisms and components are already known and will not, therefore, be explained further.

According to the present invention, in the camera 101 of the above-explained configuration, a red-eye reducing lamp 120 constituting a light emitting member for alleviating the red-eye effect in the flash-assisted phototaking operation, is provided under the flash reflector 111 of the flash emitting portion 110. The above-mentioned red-eye reducing lamp 120 is provided with a reflecting mirror 121 for defining the irradiating characteristics of the lamp 120. The red-eye reducing lamp 120 and the flash reflector 111 of the above-mentioned flash emitting portion 110 are formed as a unit 122.

The Fresnel lens 113, positioned in front of the flash emitting portion 110 and constituting the flash emission characteristic modifying member for modifying the irradiation characteristics of the flash light 114 toward the object side, is partially so extended as to completely cover the front side of the red-eye reducing lamp 120 composed of the light emitting member adjacent to the flash emitting portion 110.

In the above-explained configuration in which the red-eye reducing lamp 120 consisting of the light emitting member is supported at a position adjacent to the flash reflector 111 so as to be adjacent to the flash emitting portion 110 and the Fresnel lens 113 covering the front side of the flash emitting portion 110 is so extended as to also cover the front side of the red-eye reducing lamp 120, the flash light 115 from the flash emitting portion 110 is not intercepted by the red-eye reducing lamp 120 and remains intact at the flash-assisted phototaking operation, so that shadow or uneven illumination does not occur on the object. It is also possible to concentrate the light from the red-eye reducing lamp 120 by the Fresnel lens 113.

Also in the above-explained configuration in which the Fresnel lens 113 (flash emission characteristic modifying member) for modifying the direction of emission of the flash light 115 is provided covering both the flash emitting portion 110 and the adjacent red-eye reducing lamp 120 and is to be used by both, so that the unevenness of the lights from both light emitting parts can be prevented on the object, owing to the function of the Fresnel lens 113.

The peripheral portion of the Fresnel lens 113, covering the red-eye reducing lamp 120, may be so formed as to achieve more effective distribution of the light therefrom, or may be provided with a separate Fresnel lens in front of the red-eye reducing lamp 120, with a range not detrimentally affecting the flash light 115.

In the embodiment explained above, as will be apparent from FIG. 5A, the flash emitting portion 110 and the red-eye reducing lamp 120 are positioned in parallel, respectively facing two different positions of a continuous Fresnel-shaped area 113a of the Fresnel lens 113.

By inclining the optical axis of the red-eye reducing lamp 120 relative to the phototaking optical axis, as shown in FIG. 5B, according to the wedge shape of the Fresnel-shaped area 113a of the Fresnel lens 113, it is easily possible to direct the light from the red-eye reducing lamp 120 toward the eyes of the object person, substantially parallel to the optical axis of the phototaking lens 103. In this manner the red-eye reducing effect can be fully exploited.

Also as the front side of the red-eye reducing lamp 120 is covered, together with the flash emitting portion 110, by the same Fresnel lens 113, both lateral portions of the red-eye reducing lamp 120 can be made less visible from the outside of the camera 101, so that the external appearance of the camera can be made more agreeable.

The red-eye reducing lamp 120 consisting of the light emitting member is inclined with respect to the phototaking optical axis, with a suitable angle matching the Fresnel shape 113a of the Fresnel lens 113 constituting the flash emission characteristic modifying member, and is subject to various modifications.

The present invention is not limited by the above-explained embodiment, but is naturally subject to suitable modifications and variations in the components of the camera 101 with built-in flash.

For example, in the foregoing embodiment, the Fresnel lens 113 constituting the flash emission characteristic modifying member featuring the present invention is given a suitable Fresnel shape 113a, but such shape is not limitative and any other shape may be arbitrarily employed as long as the lights from the flash emitting portion 110 and the red-eye reducing lamp can be projected toward the object side.

Also in the foregoing embodiment, the flash emission characteristic modifying member, covering the front side of the flash emitting portion 110 and the red-eye reducing lamp 120 consisting of the light emitting member, is composed of a Fresnel lens 113, but it may also be replaced by a configuration capable of suitably regulating the light irradiating characteristics respectively corresponding to the light emitting positions, or an integrally formed Fresnel-like member such as a panel with various lens functions or a simple protective plate composed of glass or plastics.

Also the foregoing embodiment has been explained by an application to a compact camera with a lens shutter, but the present invention is not limited to such case and is applicable to the cameras of other known structures, such as a single-lens reflex camera.

The configuration of the light emitting unit, consisting of the flash emitting portion 110 and the adjacent red-eye reducing lamp 120 and featuring the present invention, is not limited to the electronic flash device incorporated in the camera 101 but may also be formed as a detachable electronic flash device, formed separately from the camera 101.

Furthermore, in the foregoing embodiment, the light emitting member constitutes the red-eye reducing lamp 120, but the present invention is not limited to such case and can provide a similar effect for example in case the light emitting member is designed to emit the auxiliary light for achieving focusing function in the dark.

As explained in the foregoing, the camera with built-in flash of the present invention comprises a flash emitting portion provided in the camera body, a flash emission characteristic modifying member composed of a Fresnel lens positioned in front of the flash emitting portion and adapted to modify the irradiating characteristics of the flash light toward the object side, and a light emitting member positioned adjacent to the flash emitting portion and functioning as a red-eye reducing lamp, wherein a part of the flash emission characteristic modifying member is so extended as to cover the front side of the light emitting member. Thus there can be attained following excellent effects despite a simple configuration.

The light emitting member functioning as the red-eye reducing lamp is supported by the flash reflector so as to be adjacent to the flash emitting portion, so that the flash-related components can be formed as a unit. It is thus rendered possible to improve the assembling performance, to make the camera body more compact, and to avoid interception of the light from the flash emitting portion by the light emitting member at the flash-assisted phototaking operation, thereby avoiding the deficiency in the amount of light from the flash emitting portion.

The flash emission characteristic modifying member, composed of the Fresnel lens for modifying the direction of emission of the flash light, is positioned in front of the flash emitting portion and the adjacent light emitting member, for use by the both, so that the cost can be reduced in comparison with a case where Fresnel lenses or plain areas are provided respectively corresponding to the light emitting parts. Also there can be prevented the uneven light distribution on the object, by the lights from both light emitting parts.

As the front side of the light emitting member and that of the flash emitting portion are covered by a same Fresnel lens, the both lateral portions of the light emitting member can be made less visible from the outside of the camera, so that the external appearance of the camera can be made more agreeable.

The above-mentioned effects can be more enhanced by positioning the light emitting member close to the flash reflector constituting the flash emitting portion and supporting the above-mentioned light emitting member by a part of the above-mentioned flash reflector, and inclining the flash emitting member with respect to the phototaking optical axis, matching the Fresnel shape of the Fresnel lens constituting the flash emission characteristic modifying member.

What is claimed is:

1. A camera having a camera body and with a built-in flash comprising:

a flash emitting portion;

a light emitting member positioned close to said flash emitting portion;

a light transmitting member provided at a front face side of the camera body so as to cover said flash emitting portion and said light emitting member; and a protruding portion provided so as to be integral with said light transmitting member and adapted to be contacted by the camera-holding hand of the photographer in holding the camera body and to prevent said flash emitting portion and said light emitting member from being covered by said hand.

2. A camera with built-in flash according to claim 1, wherein said flash emitting portion is provided in the camera body, at a lateral portion thereof opposite to the shutter release button with respect to the center of the camera body.

3. A camera with built-in flash according to claim 1, wherein said light transmitting member is composed of a protective plate or a Fresnel lens.

4. A camera with built-in flash according to claim 1, wherein said light emitting member functions as a red-eye reducing lamp.

5. A camera having a camera body and with a built-in flash comprising:

a flash emitting portion incorporated in the camera body, in a lateral portion thereof;

a flash reflector having an upper side and a lower side;

a light emitting member provided close to the lower side of said flash reflector both of which are part of said flash emitting portion;

a light transmitting member provided at a front face side of the camera body so as to cover said flash emitting portion and said light emitting member; and a protruding portion provided on the front face of said light transmitting member and being integral therewith, out of areas thereof transmitted by the lights from said flash emitting portion and said light emitting member, and adapted to be contacted by the camera-holding hand of the photographer in holding the camera body and to prevent the front side of aid flash emitting portion and said light emitting member from being covered by said hand.

6. A camera having a camera body with a built-in flash comprising:

a flash emitting portion incorporated in the camera body;

a light emitting member positioned adjacent to said flash emitting portion; and a flash emission characteristic modifying member provided in front of said flash emitting portion and said light emitting member and adapted to modify the irradiating characteristic of the flash light emitted toward the object side, wherein said flash emission character modifying member is composed of a Fresnel lens, and wherein said light emitting member is inclined, with respect to a phototaking optical axis, matching a Fresnel shape of said Fresnel lens.

7. A camera with built-in flash according to claim 6, wherein said light emitting member and a flash reflector constituting a part of said flash emitting portion is formed as a unit.

8. A camera with built-in flash according to claim 6, wherein said light emitting member functions as a red-eye reducing lamp.

9. A camera having a camera body, comprising:

a built-in flash unit disposed in a front face of the camera body;

a red-eye reducing lamp disposed proximate said built-in flash unit, said red-eye reducing lamp emitting light to reduce red-eye effect;

a Fresnel lens to transmit light from said built-in flash unit and said red-eye reducing lamp; and a protruding portion formed integral with said Fresnel lens, wherein components of said built-in flash unit and said red-eye reducing lamp form an integral unit.

10. A camera as claimed in claim 9, wherein said protruding portion includes two projections raised above the camera body.

* * * * *

UNITED STATES PATENT AND TRADEMARK OFFICE
CERTIFICATE OF CORRECTION

PATENT NO. : 5,634,152
DATED : May 27, 1997
INVENTOR(S) : Minoru KATO et al

It is certified that error appears in the above-indentified patent and that said Letters Patent is hereby corrected as shown below:

Column 12
    Line 14 (claim 5), "aid" should be --said--.

Signed and Sealed this

Eighteenth Day of November 1997

Attest:

BRUCE LEHMAN

*Attesting Officer*       *Commissioner of Patents and Trademarks*